US012706121B2

(12) United States Patent
Ran et al.

(10) Patent No.: US 12,706,121 B2
(45) Date of Patent: Aug. 11, 2026

(54) TECHNIQUES FOR SEARCHING THROUGH DIGITAL MEDIA ASSETS

(71) Applicant: Apple Inc., Cupertino, CA (US)

(72) Inventors: Niva A. Ran, Stanford, CA (US); Brandon Mach, Alpharetta, GA (US); David Wang, San Francisco, CA (US); Julia Xu, Mountain View, CA (US); Prashant Nandakumar, Cupertino, CA (US); Soutik Chakraborty, Sunnyvale, CA (US); Xiaoli Xi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/198,902

(22) Filed: May 5, 2025

(65) Prior Publication Data

US 2025/0342862 A1 Nov. 6, 2025

Related U.S. Application Data

(60) Provisional application No. 63/642,416, filed on May 3, 2024.

(51) Int. Cl.

| | |
|---|---|
| ***G11B 27/10*** | (2006.01) |
| ***G06F 16/435*** | (2019.01) |
| ***G06F 16/438*** | (2019.01) |
| ***G11B 27/34*** | (2006.01) |

(52) U.S. Cl.

CPC .......... *G11B 27/102* (2013.01); *G06F 16/435* (2019.01); *G06F 16/438* (2019.01); *G11B 27/34* (2013.01)

(58) Field of Classification Search

CPC ..... G11B 27/102; G11B 27/34; G06F 16/435; G06F 16/438

See application file for complete search history.

(56) References Cited

U.S. PATENT DOCUMENTS

| | | | | |
|---|---|---|---|---|
| 8,060,227 | B2 * | 11/2011 | Stefik | G06Q 30/02 700/94 |
| 10,455,288 | B2 * | 10/2019 | McCarty | G06F 16/24578 |
| 2010/0082663 | A1 * | 4/2010 | Cortes | G06F 16/41 707/769 |
| 2014/0156447 | A1 * | 6/2014 | Pack | G06Q 30/0621 705/26.5 |

(Continued)

*Primary Examiner* — Mishawn N. Hunter

(74) *Attorney, Agent, or Firm* — DICKINSON WRIGHT RLLP

(57) ABSTRACT

A method for searching for relevant temporal segments within digital media assets is disclosed. The method may include receiving multiple digital media assets to be considered when responding to search requests, identifying respective properties for the multiple digital media assets, receiving a search request that includes at least one search parameter, and identifying, a subset of the multiple digital media assets that correspond to the at least one search parameter. The method may further include parsing the subset of the multiple digital media assets to identify respective temporal segments within corresponding ones of the subset, filtering the subset based on respective relevance scores, and outputting a user interface that displays, respective first information that is based on the subset, and respective second information that is based on the respective temporal segments.

20 Claims, 14 Drawing Sheets

(56) References Cited

U.S. PATENT DOCUMENTS

| | | | | |
|---|---|---|---|---|
| 2014/0181660 | A1* | 6/2014 | Gentile | G11B 27/034 715/716 |
| 2015/0310891 | A1* | 10/2015 | Pello | G11B 20/10527 369/47.16 |
| 2018/0067935 | A1* | 3/2018 | Kumar | G06F 16/435 |
| 2025/0291843 | A1* | 9/2025 | Lee | G06F 16/71 |

* cited by examiner

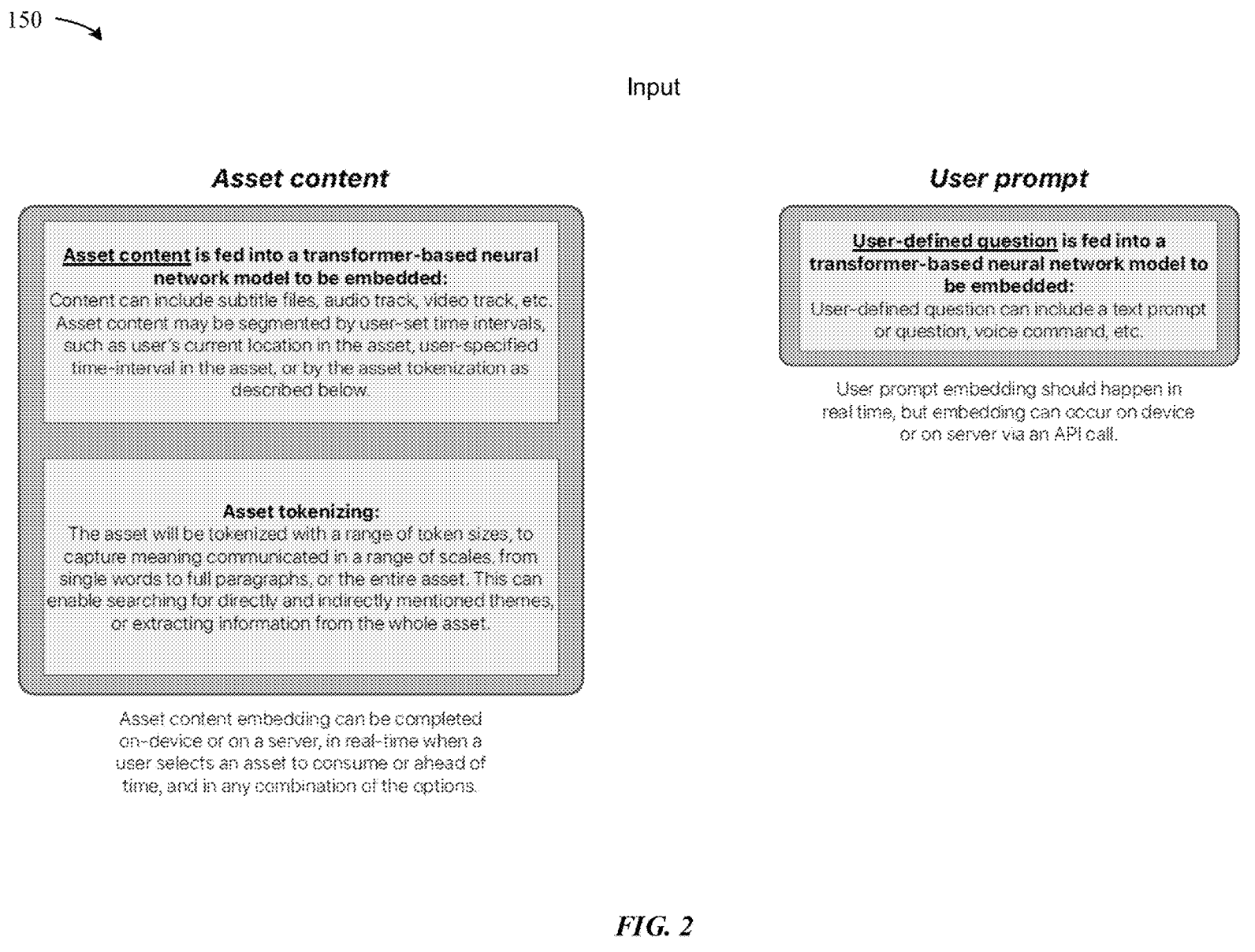

150

Input

*Asset content*

Asset content is fed into a transformer-based neural network model to be embedded:
Content can include subtitle files, audio track, video track, etc. Asset content may be segmented by user-set time intervals, such as user's current location in the asset, user-specified time-interval in the asset, or by the asset tokenization as described below.

Asset tokenizing:
The asset will be tokenized with a range of token sizes, to capture meaning communicated in a range of scales, from single words to full paragraphs, or the entire asset. This can enable searching for directly and indirectly mentioned themes, or extracting information from the whole asset.

Asset content embedding can be completed on-device or on a server, in real-time when a user selects an asset to consume or ahead of time, and in any combination of the options.

*User prompt*

User-defined question is fed into a transformer-based neural network model to be embedded:
User-defined question can include a text prompt or question, voice command, etc.

User prompt embedding should happen in real time, but embedding can occur on device or on server via an API call.

*FIG. 2*

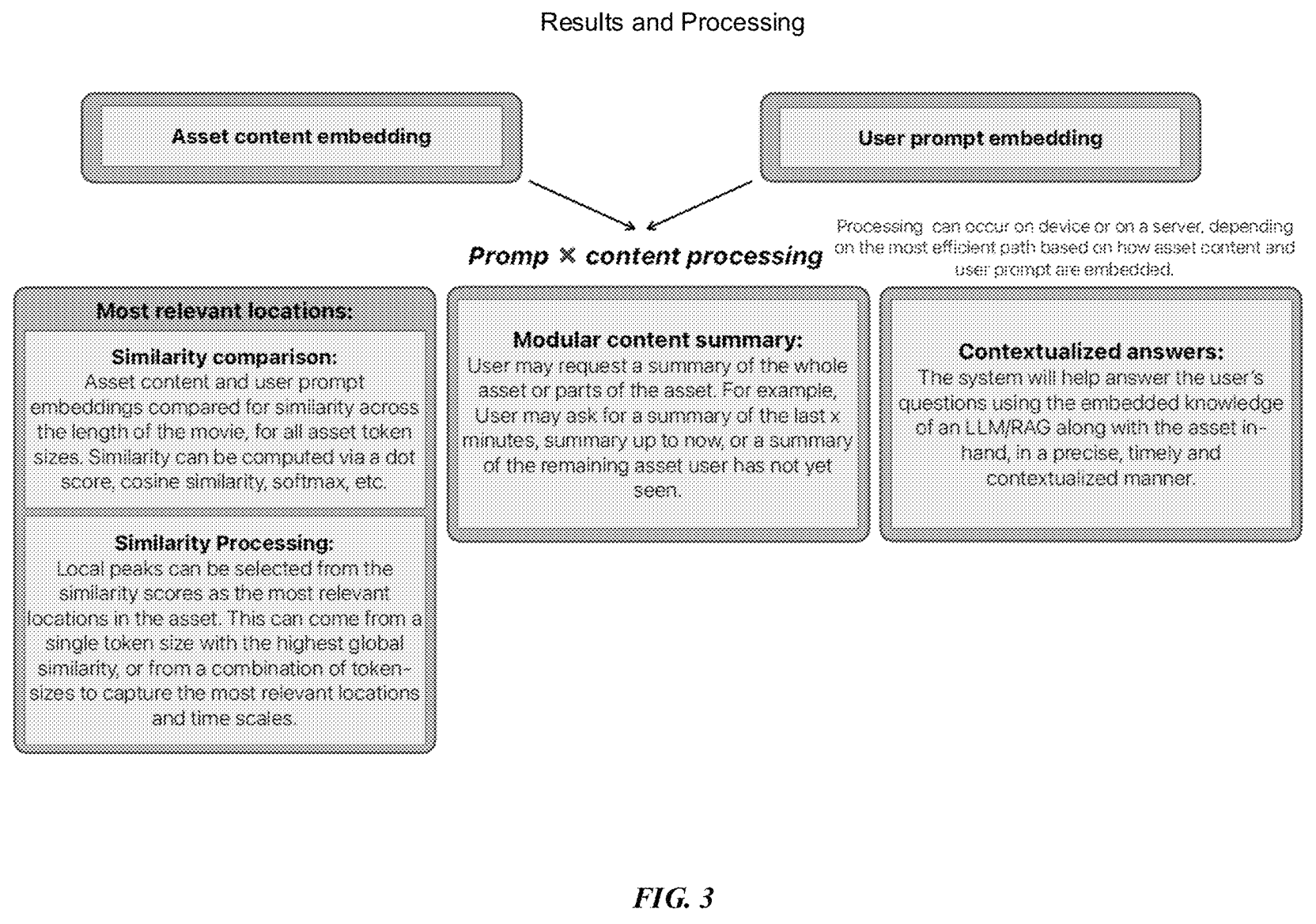

Results and Processing

Asset content embedding

User prompt embedding

*Promp × content processing*

Processing can occur on device or on a server, depending on the most efficient path based on how asset content and user prompt are embedded.

Most relevant locations:

Similarity comparison:
Asset content and user prompt embeddings compared for similarity across the length of the movie, for all asset token sizes. Similarity can be computed via a dot score, cosine similarity, softmax, etc.

Similarity Processing:
Local peaks can be selected from the similarity scores as the most relevant locations in the asset. This can come from a single token size with the highest global similarity, or from a combination of token-sizes to capture the most relevant locations and time scales.

Modular content summary:
User may request a summary of the whole asset or parts of the asset. For example, User may ask for a summary of the last x minutes, summary up to now, or a summary of the remaining asset user has not yet seen.

Contextualized answers:
The system will help answer the user's questions using the embedded knowledge of an LLM/RAG along with the asset in-hand, in a precise, timely and contextualized manner.

*FIG. 3*

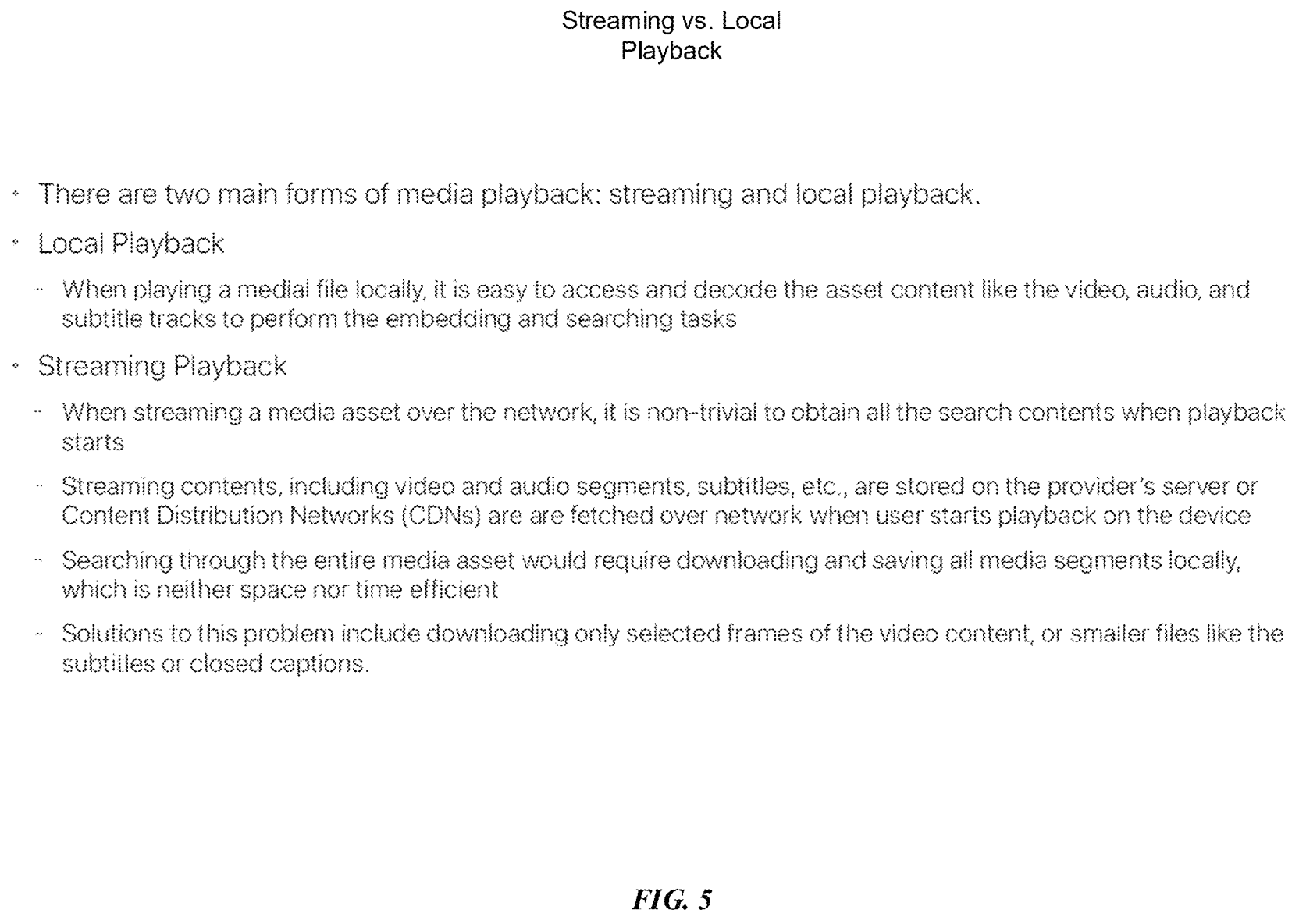

Streaming vs. Local Playback

- There are two main forms of media playback: streaming and local playback.
- Local Playback
  - When playing a medial file locally, it is easy to access and decode the asset content like the video, audio, and subtitle tracks to perform the embedding and searching tasks
- Streaming Playback
  - When streaming a media asset over the network, it is non-trivial to obtain all the search contents when playback starts
  - Streaming contents, including video and audio segments, subtitles, etc., are stored on the provider's server or Content Distribution Networks (CDNs) are are fetched over network when user starts playback on the device
  - Searching through the entire media asset would require downloading and saving all media segments locally, which is neither space nor time efficient
  - Solutions to this problem include downloading only selected frames of the video content, or smaller files like the subtitles or closed captions.

*FIG. 5*

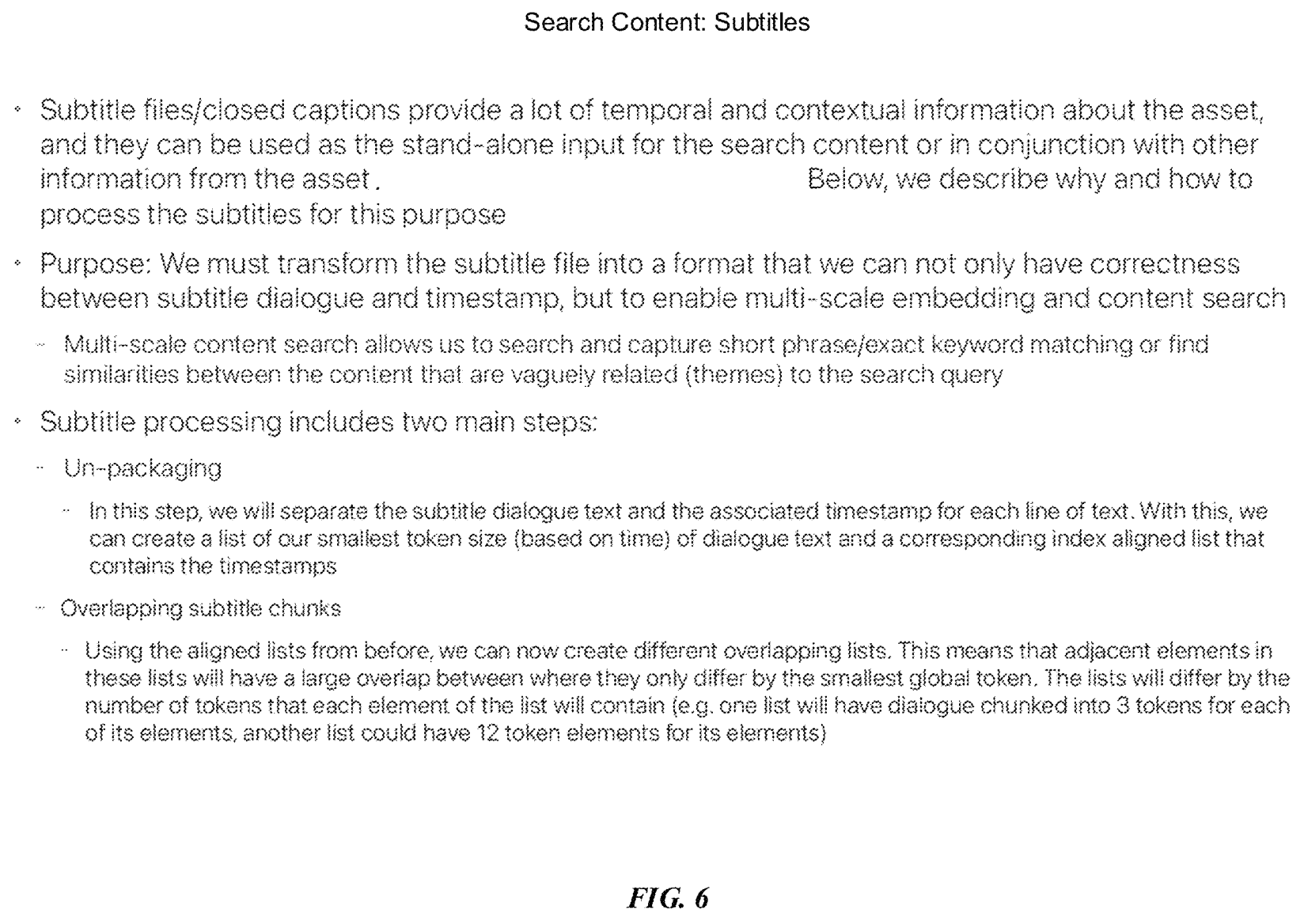

Search Content: Subtitles

- Subtitle files/closed captions provide a lot of temporal and contextual information about the asset, and they can be used as the stand-alone input for the search content or in conjunction with other information from the asset . Below, we describe why and how to process the subtitles for this purpose
- Purpose: We must transform the subtitle file into a format that we can not only have correctness between subtitle dialogue and timestamp, but to enable multi-scale embedding and content search
  - Multi-scale content search allows us to search and capture short phrase/exact keyword matching or find similarities between the content that are vaguely related (themes) to the search query
- Subtitle processing includes two main steps:
  - Un-packaging
    - In this step, we will separate the subtitle dialogue text and the associated timestamp for each line of text. With this, we can create a list of our smallest token size (based on time) of dialogue text and a corresponding index aligned list that contains the timestamps
  - Overlapping subtitle chunks
    - Using the aligned lists from before, we can now create different overlapping lists. This means that adjacent elements in these lists will have a large overlap between where they only differ by the smallest global token. The lists will differ by the number of tokens that each element of the list will contain (e.g. one list will have dialogue chunked into 3 tokens for each of its elements, another list could have 12 token elements for its elements)

*FIG. 6*

Search Content: Subtitles

Raw subtitle data

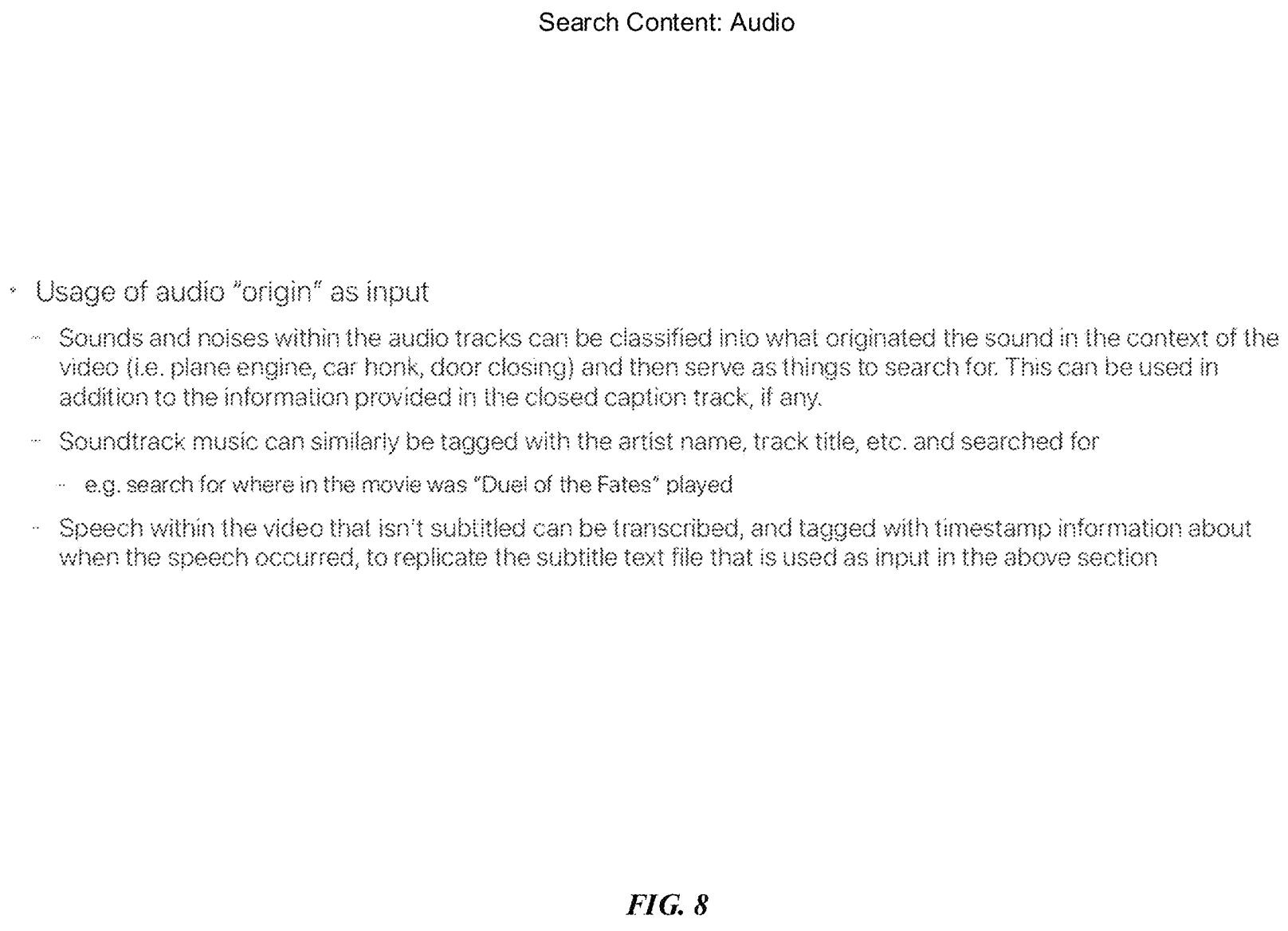

Search Content: Audio

- Usage of audio "origin" as input
  - Sounds and noises within the audio tracks can be classified into what originated the sound in the context of the video (i.e. plane engine, car honk, door closing) and then serve as things to search for. This can be used in addition to the information provided in the closed caption track, if any.
  - Soundtrack music can similarly be tagged with the artist name, track title, etc. and searched for
    - e.g. search for where in the movie was "Duel of the Fates" played
  - Speech within the video that isn't subtitled can be transcribed, and tagged with timestamp information about when the speech occurred, to replicate the subtitle text file that is used as input in the above section

*FIG. 8*

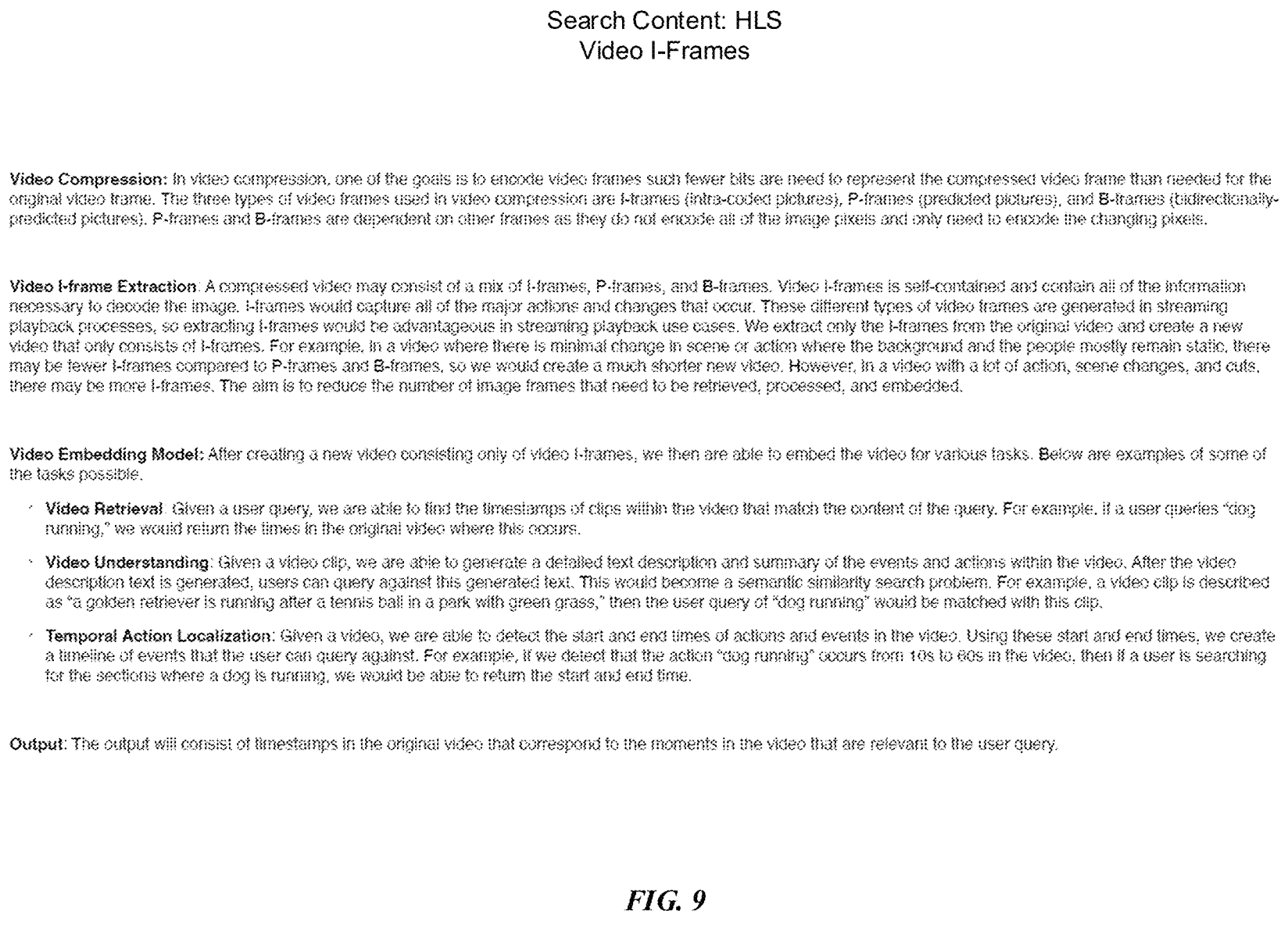

Search Content: HLS
Video I-Frames

Video Compression: In video compression, one of the goals is to encode video frames such fewer bits are need to represent the compressed video frame than needed for the original video frame. The three types of video frames used in video compression are I-frames (intra-coded pictures), P-frames (predicted pictures), and B-frames (bidirectionally-predicted pictures). P-frames and B-frames are dependent on other frames as they do not encode all of the image pixels and only need to encode the changing pixels.

Video I-frame Extraction: A compressed video may consist of a mix of I-frames, P-frames, and B-frames. Video I-frames is self-contained and contain all of the information necessary to decode the image. I-frames would capture all of the major actions and changes that occur. These different types of video frames are generated in streaming playback processes, so extracting I-frames would be advantageous in streaming playback use cases. We extract only the I-frames from the original video and create a new video that only consists of I-frames. For example, in a video where there is minimal change in scene or action where the background and the people mostly remain static, there may be fewer I-frames compared to P-frames and B-frames, so we would create a much shorter new video. However, in a video with a lot of action, scene changes, and cuts, there may be more I-frames. The aim is to reduce the number of image frames that need to be retrieved, processed, and embedded.

Video Embedding Model: After creating a new video consisting only of video I-frames, we then are able to embed the video for various tasks. Below are examples of some of the tasks possible.

- Video Retrieval: Given a user query, we are able to find the timestamps of clips within the video that match the content of the query. For example, if a user queries "dog running," we would return the times in the original video where this occurs.
- Video Understanding: Given a video clip, we are able to generate a detailed text description and summary of the events and actions within the video. After the video description text is generated, users can query against this generated text. This would become a semantic similarity search problem. For example, a video clip is described as "a golden retriever is running after a tennis ball in a park with green grass," then the user query of "dog running" would be matched with this clip.
- Temporal Action Localization: Given a video, we are able to detect the start and end times of actions and events in the video. Using these start and end times, we create a timeline of events that the user can query against. For example, if we detect that the action "dog running" occurs from 10s to 60s in the video, then if a user is searching for the sections where a dog is running, we would be able to return the start and end time.

Output: The output will consist of timestamps in the original video that correspond to the moments in the video that are relevant to the user query.

*FIG. 9*

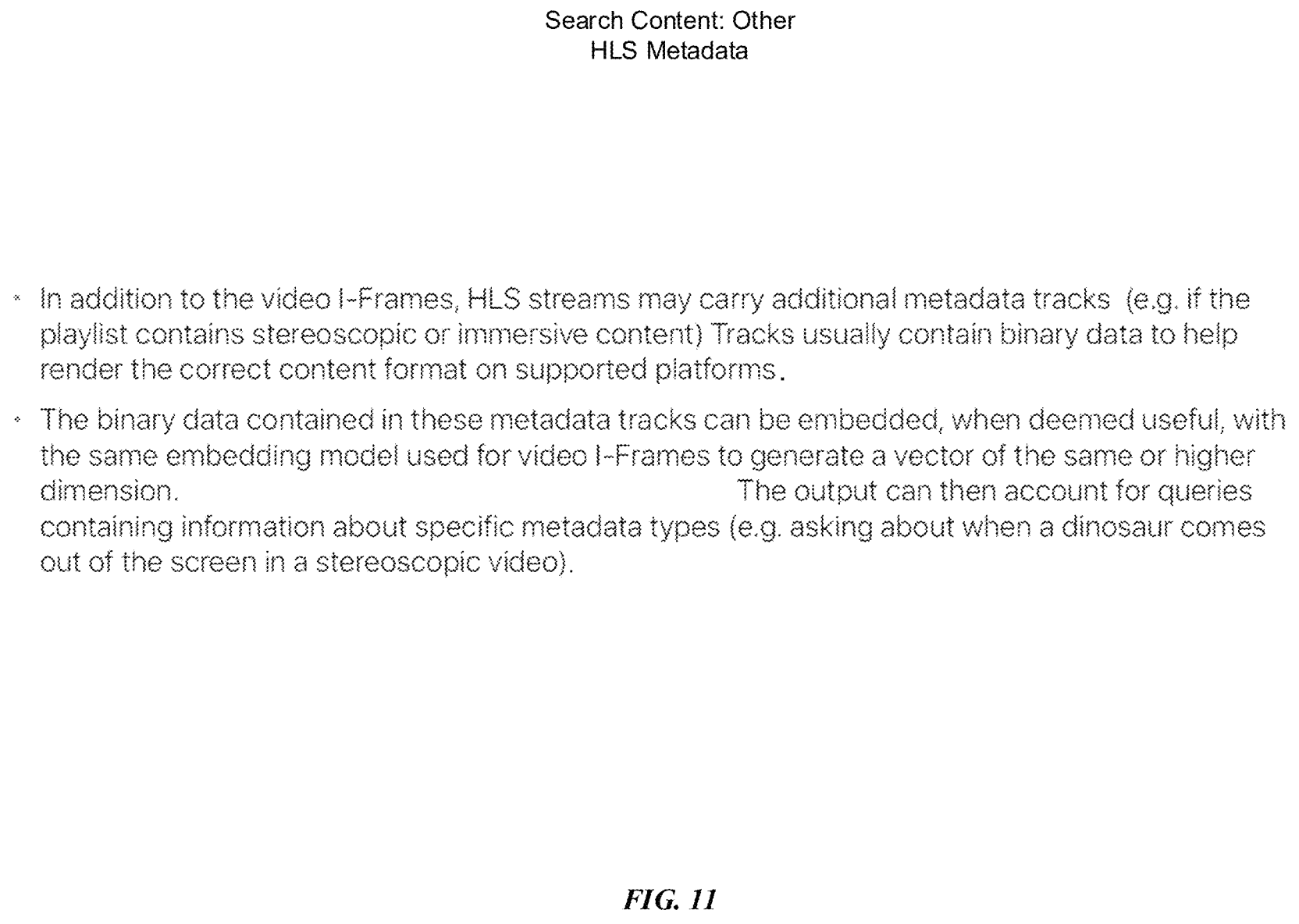

Search Content: Other
HLS Metadata

- In addition to the video I-Frames, HLS streams may carry additional metadata tracks (e.g. if the playlist contains stereoscopic or immersive content) Tracks usually contain binary data to help render the correct content format on supported platforms.
- The binary data contained in these metadata tracks can be embedded, when deemed useful, with the same embedding model used for video I-Frames to generate a vector of the same or higher dimension. The output can then account for queries containing information about specific metadata types (e.g. asking about when a dinosaur comes out of the screen in a stereoscopic video).

*FIG. 11*

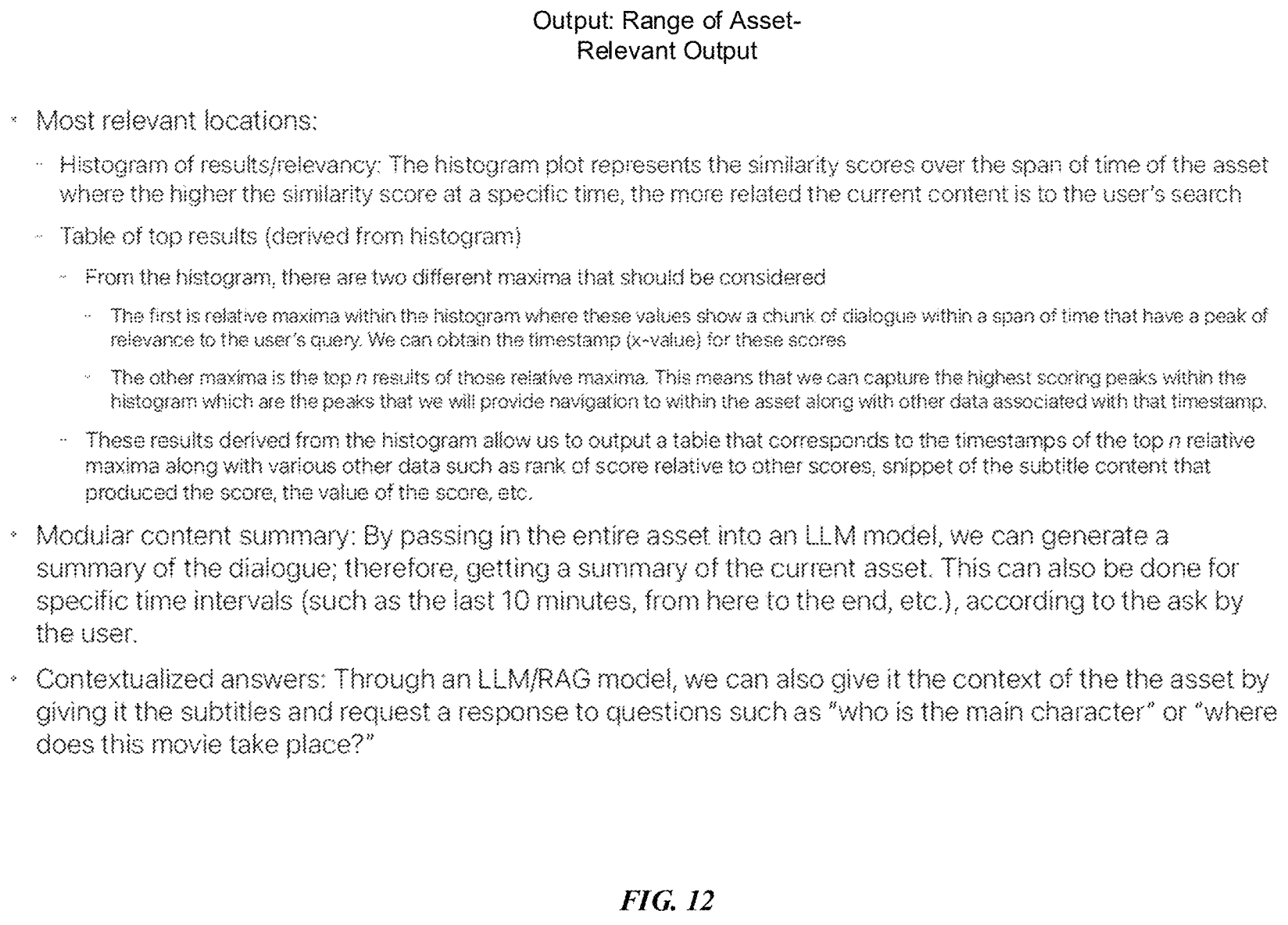

Output: Range of Asset-Relevant Output

- Most relevant locations:
  - Histogram of results/relevancy: The histogram plot represents the similarity scores over the span of time of the asset where the higher the similarity score at a specific time, the more related the current content is to the user's search
  - Table of top results (derived from histogram)
    - From the histogram, there are two different maxima that should be considered
      - The first is relative maxima within the histogram where these values show a chunk of dialogue within a span of time that have a peak of relevance to the user's query. We can obtain the timestamp (x-value) for these scores
      - The other maxima is the top *n* results of those relative maxima. This means that we can capture the highest scoring peaks within the histogram which are the peaks that we will provide navigation to within the asset along with other data associated with that timestamp.
    - These results derived from the histogram allow us to output a table that corresponds to the timestamps of the top *n* relative maxima along with various other data such as rank of score relative to other scores, snippet of the subtitle content that produced the score, the value of the score, etc.
- Modular content summary: By passing in the entire asset into an LLM model, we can generate a summary of the dialogue; therefore, getting a summary of the current asset. This can also be done for specific time intervals (such as the last 10 minutes, from here to the end, etc.), according to the ask by the user.
- Contextualized answers: Through an LLM/RAG model, we can also give it the context of the the asset by giving it the subtitles and request a response to questions such as "who is the main character" or "where does this movie take place?"

*FIG. 12*

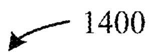
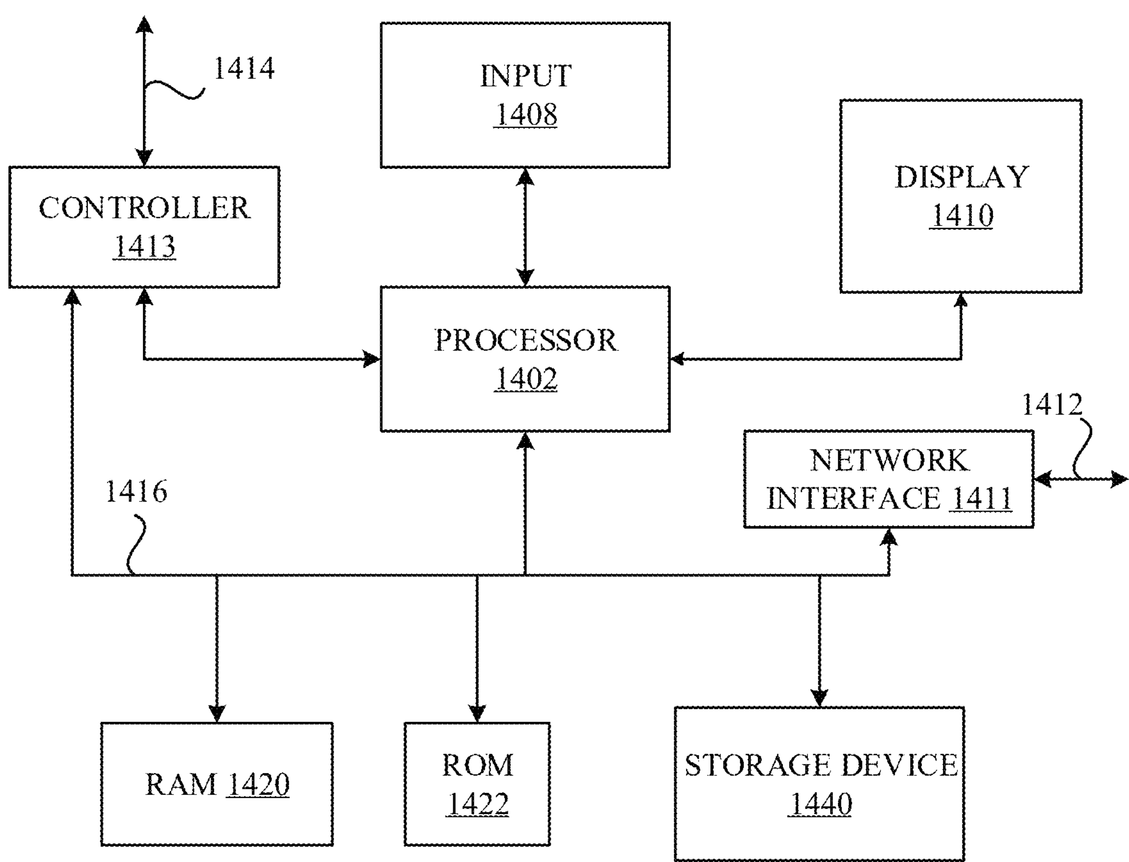
*FIG. 14*

TECHNIQUES FOR SEARCHING THROUGH DIGITAL MEDIA ASSETS

CROSS-REFERENCE TO RELATED APPLICATIONS

The present application claims the benefit of U.S. Provisional Application No. 63/642,416, entitled "TECHNIQUES FOR SEARCHING THROUGH DIGITAL MEDIA ASSETS," filed May 3, 2024, the content of which is incorporated by reference herein in its entirety for all purposes.

FIELD

The described embodiments set forth techniques for searching through digital media assets. In particular, the described embodiments set forth techniques for utilizing a temporally-aware multimodal large language model (LLM) to enable searching through digital media assets.

BACKGROUND

Industry-standard navigation of a media asset remains rudimentary. Generally, it involves a user manually scrolling through the media asset scrub bar, based on relative location in the asset. In this regard, there currently exists no way for users to intelligently find locations in the asset based on content.

SUMMARY

The described embodiments set forth techniques for searching through digital media assets. In particular, the described embodiments set forth techniques for utilizing a temporally-aware multimodal large-language model (LLM) to enable searching through digital media assets.

One embodiment sets forth a method for searching for relevant temporal segments within digital media assets. According to some embodiments, the method can be implemented by a computing device, and includes the steps of receiving a plurality of digital media assets to be considered when responding to search requests, identifying respective properties for the plurality of digital media assets, receiving a search request that includes at least one search parameter, identifying a subset of the plurality of digital media assets that correspond to the at least one search parameter, parsing the subset of the plurality of digital media assets to identify respective temporal segments within the subset of the plurality of digital media assets that corresponds to the at least one search parameter, wherein a given respective temporal segment of the respective temporal segments is associated with a respective relevance score that quantifies a respective strength of a correspondence between the given respective temporal segment and the at least one search parameter, filtering the subset of the plurality of digital media assets based on respective relevance scores, and outputting a user interface that displays, respective first information that is based on the subset of the plurality of digital media assets, and respective second information that is based on the respective temporal segments.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 2-12 illustrate conceptual diagrams of techniques for implementing a temporally-aware multimodal large-language model (LLM) to enable searching through digital media assets, according to some embodiments.

FIG. 14 illustrates a detailed view of a computing device that can be configured to implement the various components described herein, according to some embodiments.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth techniques for implementing a temporally-aware multimodal large language model (LLM) to enable searching through digital media assets.

Figure 1:
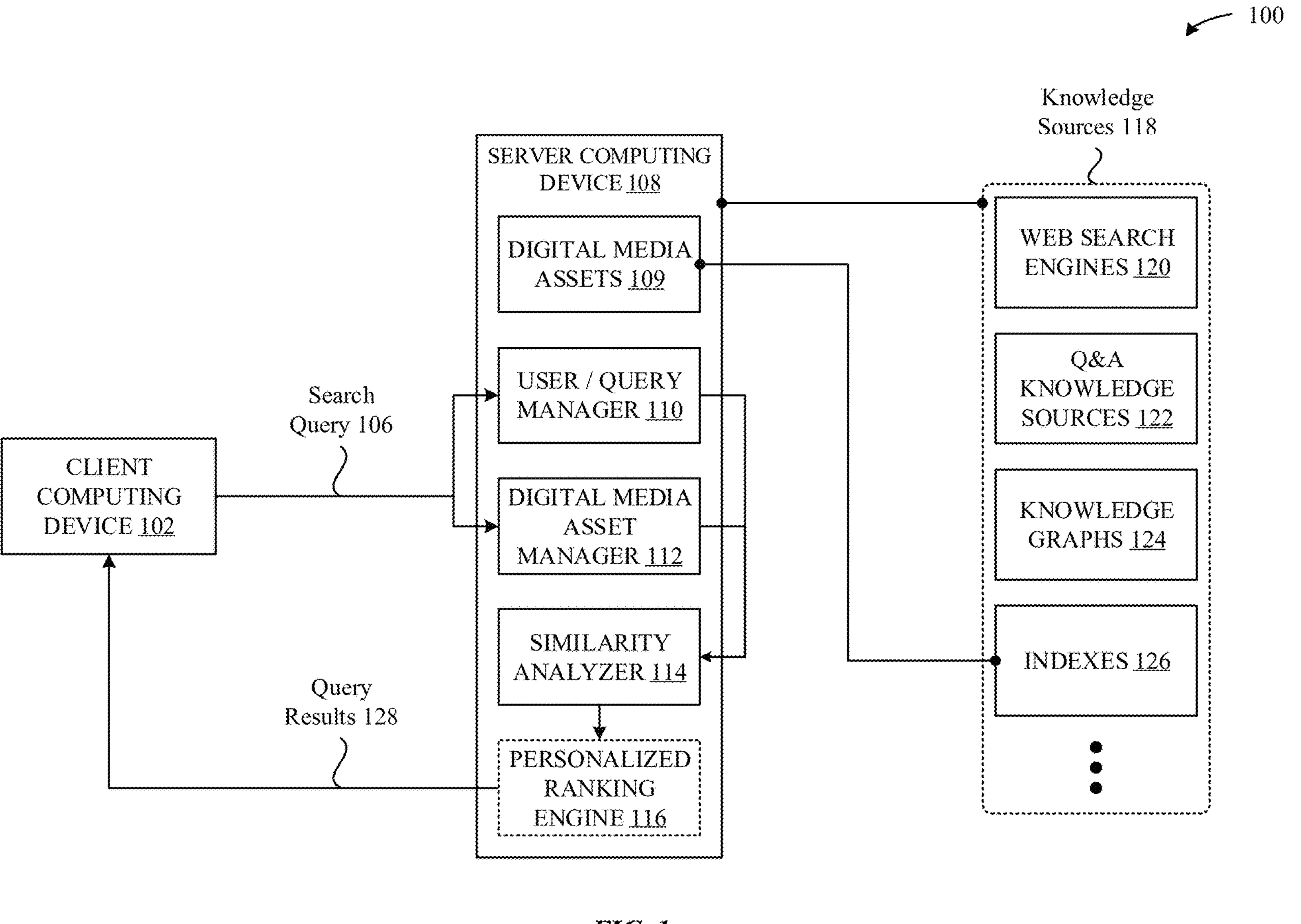
FIG. 1 illustrates a block diagram of different components of a system that can be configured to implement the various techniques described herein, according to some embodiments.
Figure 4:
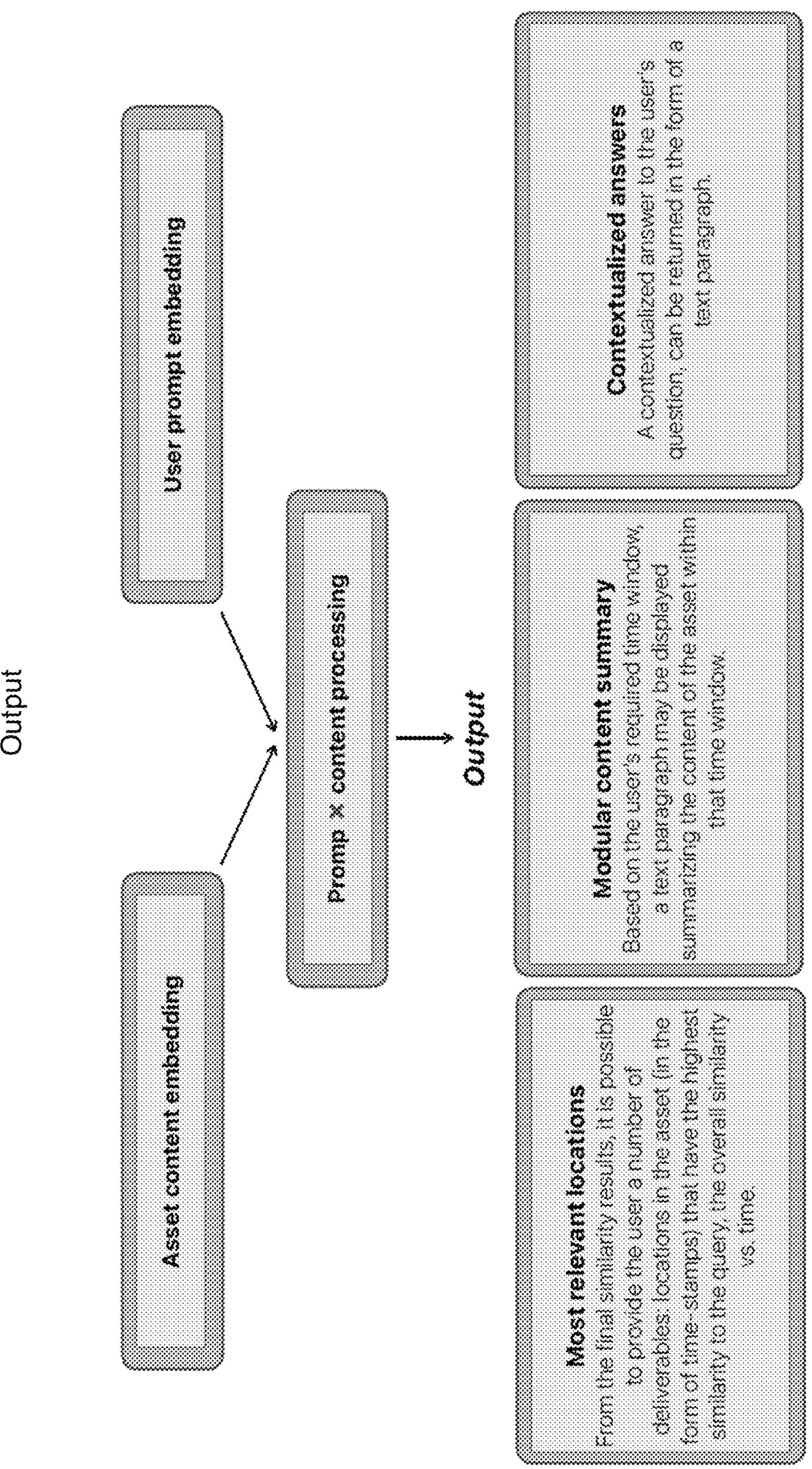
Figure 7:
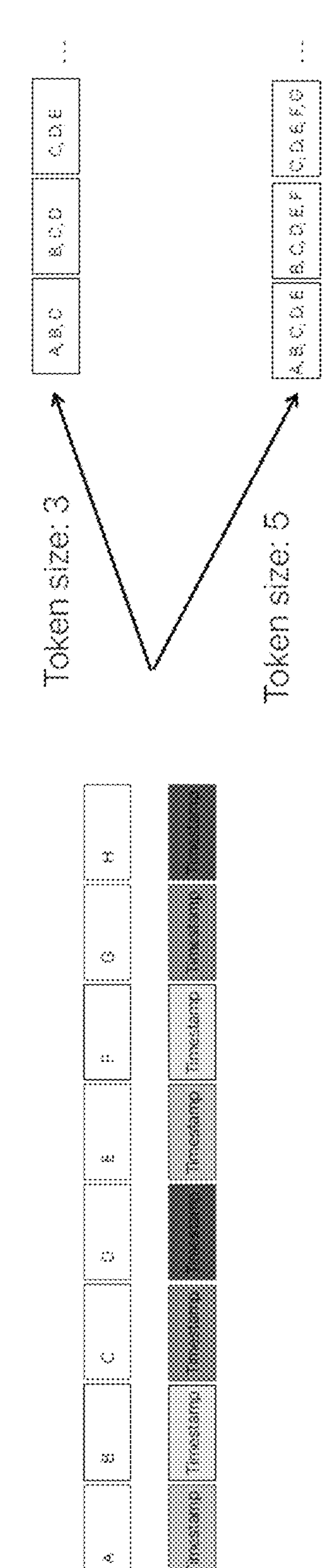
Figure 10:
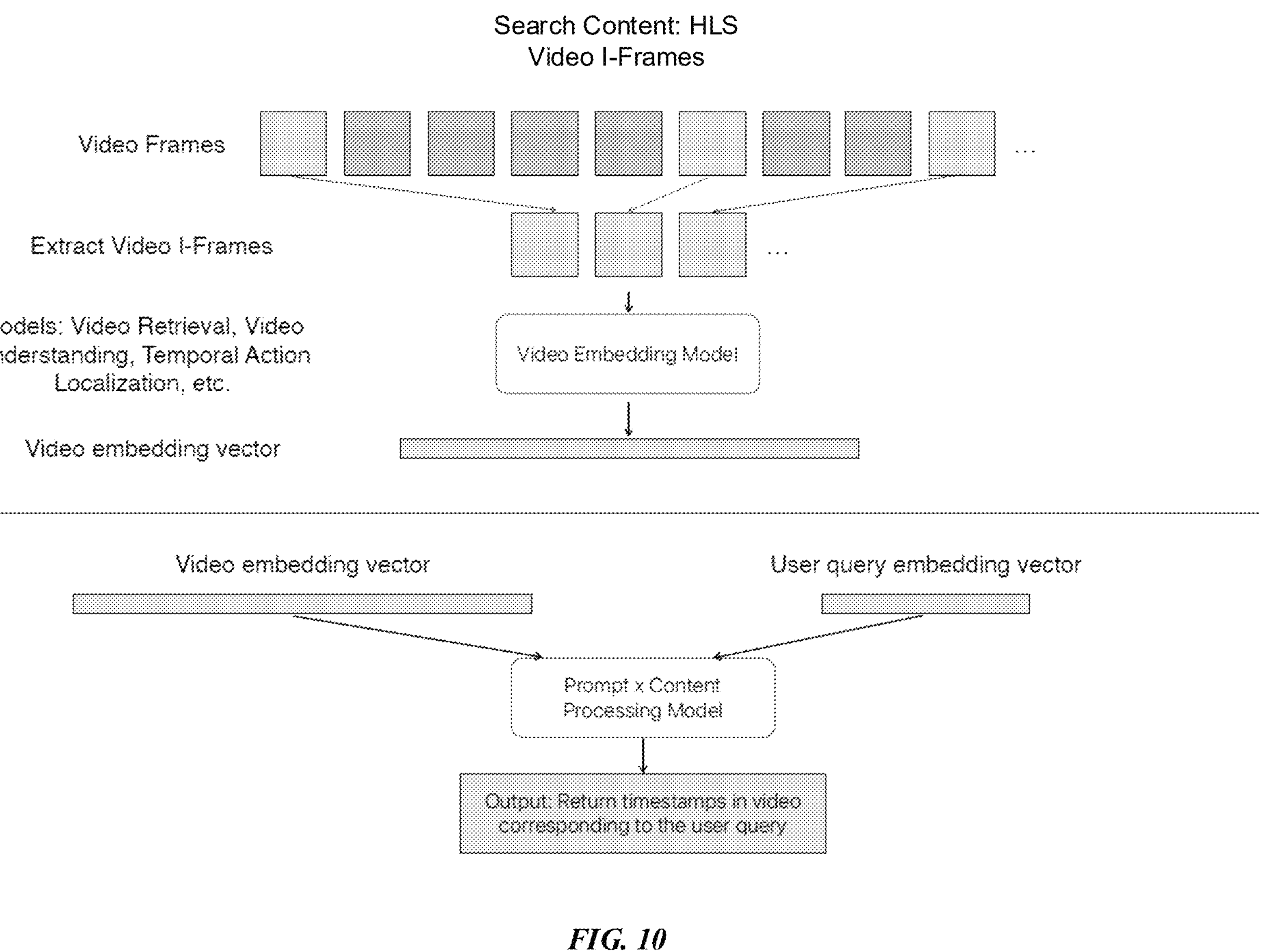

FIG. 1 illustrates a block diagram of different components of a system 100 that can be configured to implement the various techniques described herein, according to some embodiments. As shown in FIG. 1, the system 100 can include a client computing device 102 and a server computing device 108. It is noted that, in the interest of simplifying this disclosure, the client computing device 102 and the server computing device 108 are typically discussed in singular capacities. In that regard, it should be appreciated that the system 100 can include any number of client computing devices 102 and server computing devices 108, without departing from the scope of this disclosure.

According to some embodiments, the client computing device 102 and the server computing device 108 can represent any form of computing device operated by an individual, an entity, etc., such as a wearable computing device, a smartphone computing device, a tablet computing device, a laptop computing device, a desktop computing device, a gaming computing device, a smart home computing device, an Internet of Things (IOT) computing device, a rack mount computing device, and so on. It is noted that the foregoing examples are not meant to be limiting, and that the client computing device 102/server computing device 108 can represent any type, form, etc., of computing device, without departing from the scope of this disclosure.

As shown in FIG. 1, the client computing device 102 can be associated with (i.e., logged into) a user account that is known to the server computing device 108. For example, the user account can be associated with username/password information, demographic-related information, device-related information (e.g., identifiers of client computing devices 102 associated with the user account), and the like. The user account can also be associated with conversation history information, which can include information associated with search queries 106 (provided by the client computing device 102), query results 128 (returned to the client computing device 102), as well as any other type, form, etc., of information, at any level of granularity, pertaining to activity performed at the client computing device 102, activity performed at the server computing device 108, the interactions between the client computing device 102 and the server computing device 108, and so on. The user account can also be associated with a user account vector (that is based at least in part on the user account), query vectors (that are based at least in part on search queries 106 provided by client computing devices 102 associated with the user account), and the like.

As shown in FIG. 1, the server computing device 108 can manage, access, etc., digital media assets 109 (e.g., stored on one or more local storage devices, one or more network storage devices, one or more cloud-based storages, etc.). According to some embodiments, the digital media assets 109 can represent any form of media content (that is stored locally, remotely, streamed, etc.), such as audio files, video files, and so on. According to some embodiments, each digital media asset 109 can be associated with metadata content, file content, and so on. As described in greater detail herein, each digital media asset 109 can be associated with additional information, such as a digital media asset metadata vector (that is based at least in part on metadata of the digital media asset 109), a digital media asset file content vector (that is based at least in part on file content of the digital media asset 109), and the like.

As shown in FIG. 1, and as described in greater detail herein, the client computing device 102 can issue search queries 106 to the server computing device 108 (e.g., via the Internet, a network connection, etc.), where, in turn, the server computing device 108 can generate and provide query results 128 to the client computing device 102 (over the aforementioned connections, a different connection, etc.). According to some embodiments, the query results 128 can be organized, formatted, etc., in a manner that is understood by the client computing device 102. In turn, the client computing device 102 can display the query results 128 using the appropriate applications, user interfaces, etc., to enable a user of the client computing device 102 to interact with the query results 128.

As described in greater detail herein, the user account can be utilized to improve the overall accuracy of the query results 128 that are generated and provided by the server computing device 108 for search queries 106. According to some embodiments, the server computing device 108 can implement a user/query manager 110. According to some embodiments, the user/query manager 110 can be configured to generate/maintain the aforementioned user account vectors for the user accounts, to generate query vectors for search queries 106 received from client computing devices 102 associated with the user accounts, and to perform other functionalities that are described herein.

According to some embodiments, the server computing device 108 can implement a digital media asset manager 112. According to some embodiments, the digital media asset manager 112 can be configured to generate/maintain the aforementioned digital media asset metadata vectors, digital media asset file content vectors, etc., for the digital media assets 109, and to perform other functionalities that are described herein.

According to some embodiments, the user/query manager 110 can generate user/query output vectors (e.g., based on a user account vector and a query vector). Moreover, the digital media asset manager 112 can generate digital media asset output vectors (e.g., based on digital media asset metadata vectors and digital media asset file content vectors). In turn, the aforementioned output vectors can be utilized to provide query results 128 that are relevant to the search queries 106, that are personalized to the user accounts, and so on.

Additionally, and as shown in FIG. 1, the server computing device 108 can implement a similarity analyzer 114, which can be configured to compare the outputs from the user/query manager 110 and the digital media asset manager 112 (i.e., the user/query output vectors and the digital media asset output vectors, respectively). In particular, the similarity analyzer 114 can implement algorithms that compare the similarities between the aforementioned output vectors, generate scores that represent/coincide with the similarities, and so on. The algorithms can include, for example, Cosine Similarity, Euclidean Distance, Manhattan Distance (L1 norm), Jaccard Similarity, Hamming Distance, Pearson Correlation Coefficient, Spearman Rank Correlation, Minkowski Distance, Kullback-Leibler Divergence (KL Divergence), and so on. It is noted that the foregoing examples are not meant to be limiting, and that the similarity analyzer 114 can implement any number, type, form, etc., of similarity analysis algorithms, at any level of granularity, consistent with the scope of this disclosure.

According to some embodiments, the user/query manager 110, the digital media asset manager 112, and the similarity analyzer 114 can represent one or more artificial intelligence (AI) models-such as small language models (SLMs), large language models (LLMs), rule-based models, traditional machine learning models, custom models, ensemble models, knowledge graph models, hybrid models, domain-specific models, sparse models, transfer learning models, symbolic artificial intelligence (AI) models, generative adversarial network models, reinforcement learning models, biological models, and the like. It is noted that the foregoing examples are not meant to be limiting, and that any number, type, form, etc., of AI models, can be implemented by any of the entities illustrated in FIG. 1, without departing from the scope of this disclosure.

Additionally, it is noted that the server computing device 108 can be configured to identify and eliminate "AI hallucinations," which refer to the generation of false or distorted perceptions, ideas, or sensations by AI systems. This phenomenon can occur when AI models, such as LLMs, generate outputs that are not based on real data but instead originate from patterns or noise present in their training data or model architecture. Such hallucinations can manifest as incorrect information, fantastical scenarios, nonsensical sentences, or a blend of real and fabricated content. It is also noted that one or more of the entities illustrated in FIG. 1 can represent non-AI-based entities, such as rules-based systems, knowledge-based systems, and so on.

As additionally shown in FIG. 1, the server computing device 108 can implement an optional personalized ranking engine 116, which can be configured to provide query results 128 that are personalized for the user accounts (based at least in part on, for example, the similarity analyses performed by the similarity analyzer 114). Personalizing query results 128 for a given search query 106 (e.g., provided by a client computing device 102 associated with a user account), can include, for example, culling digital media assets 109 having similarity scores that do not satisfy a particular threshold (that coincides with the similarity score scheme), reordering the remaining digital media assets 109 based on their similarity scores, emphasizing digital media assets 109 having similarity scores that satisfy a particular threshold, and so on. It is noted that the foregoing examples are not meant to be limiting, and that the personalized ranking engine 116 can implement any number, type, form, etc., of operations to filter digital media assets 109 to be included in query results 128, at any level of granularity, consistent with the scope of this disclosure.

Additionally, and according to some embodiments, the personalized ranking engine 116 can be configured to implement an explanation agent (not illustrated in FIG. 1). According to some embodiments, the explanation agent can be configured to implement any number, type, form, etc., of AI models to provide explanations for one or more of the query results 128. To implement this functionality, the explanation agent can analyze any information. In one example, the explanation for a given query result 128 can include a breakdown of why the query result 128 is relevant, a breakdown of how the query result 128 was identified, a breakdown of where the query result 128 was located, and so on. It is noted that the foregoing examples are not meant to be limiting, and that the explanations can include any amount, type, form, etc., of information, at any level of granularity, without departing from the scope of this disclosure.

Additionally, it is noted that, under some configurations, the explanation agent can also be configured to provide explanations for query results 128 that were filtered out by the personalized ranking engine 116. In turn, such explanations can be utilized in any manner to improve the manner in which the system 100 generates query results 128. For example, the explanations can be used to improve the intelligence of the various AI models discussed herein, to demonstrate to end-users that time is being saved by intelligently eliminating certain results for good/explainable reasons, and so on.

Additionally, and according to some embodiments, the personalized ranking engine 116 can be configured to implement a content agent (not illustrated in FIG. 1). According to some embodiments, the content agent can be configured to implement any number, type, form, etc., of AI models to generate content that is relevant to the query results 128. For example, the content agent can implement generative adversarial networks (GANs), variational autoencoders (VAEs), recurrent neural networks (RNNs), convolutional neural networks (CNNs), neuroevolution systems, deep dream systems, style transfer systems, rule-based systems, interactive evolutionary algorithms, and so on. Such content can include, for example, digital content that corresponds to the query results 128 (e.g., text content, image content, audio content, video content, etc.). It is noted that the foregoing examples are not meant to be limiting, and that the content agent can generate any amount, type, form, etc., of digital content, at any level of granularity, without departing from the scope of this disclosure. For example, the content can include audio content, video content, document content, web content (e.g., hypertext markup language (HTML) content), programming language content, and so on.

As further shown in FIG. 1, the server computing device 108—particularly, the various entities implemented thereon—can be configured to interface with knowledge sources 118. According to some embodiments, the knowledge sources 118 can include, for example, web search engines 120, question and answer (Q&A) knowledge sources 122, knowledge graphs 124, indexes 126 (e.g., databases, approximate nearest-neighbor (ANN) indexes, inverted indexes, etc.), and so on. It is noted that the knowledge sources 118 illustrated in FIG. 1 and described herein are not meant to be limiting, and that the entities implemented on the server computing device 108 can be configured to access any type, kind, form, etc., of knowledge source 118 that is capable of receiving queries and providing responses, without departing from the scope of this disclosure. It should also be appreciated that the knowledge sources 118 can employ any number, type, form, etc., of AI models (or non-AI based approaches) to provide the various functionalities described herein, without departing from the scope of this disclosure. It should also be appreciated that the knowledge sources 118 can be implemented by any computing entity (e.g., the client computing device 102, the server computing device 108, etc.), service (e.g., cloud services), etc., without departing from the scope of this disclosure.

According to some embodiments, the web search engines 120 can represent web search entities that are capable of receiving queries and providing answers based on what is accessible via the Internet. To implement this functionality, the web search engines 120 can "crawl" the Internet, which involves identifying, parsing, and indexing the content of web pages, such that relevant content can be efficiently identified for search queries that are received.

According to some embodiments, the Q&A knowledge sources 122 can represent systems, databases, etc., that can formulate answers to questions that are commonly received. To implement this functionality, the Q&A knowledge sources 122 typically rely on structured or semi-structured knowledge bases that contain a wide range of information, facts, data, or textual content that is manually curated, generated from text corpora, or collected from various sources, such as books, articles, databases, or the Internet.

According to some embodiments, the knowledge graphs 124 can represent systems, databases, etc., that can be accessed to formulate answers to queries that are received. A given knowledge graph 124 typically constitutes a structured representation of knowledge that captures relationships and connections between entities, concepts, data points, etc. in a way that computing devices are capable of understanding.

According to some embodiments, the indexes 126 can represent systems, databases, etc., that can be accessed to formulate answers to queries that are received. For example, the indexes 126 can include an ANN index that constitutes a data structure that is arranged in a manner that enables similarity searches and retrievals in high-dimensional spaces to be efficiently performed. This makes the ANN indexes particularly useful when performing tasks that involve semantic information retrieval, recommendations, and finding similar data points, objects, and so on.

It is noted that the logical breakdown of the entities illustrated in FIG. 1—as well as the logical flow of the manner in which such entities communicate-should not be construed as limiting. On the contrary, any of the entities illustrated in FIG. 1 can be separated into additional entities within the system 100, combined together within the system 100, or removed from the system 100, without departing from the scope of this disclosure. It is additionally noted that, in the interest of unifying and simplifying this disclosure, the described embodiments primarily pertain to media file implementations. However, it should be appreciated that the embodiments disclosed herein can be implemented to receive search queries 106—and to provide query results 128—for any type of digital content, such as audio files, documents, photos, videos, spreadsheets, presentations, databases, archives, executables, scripts, web files, configuration files, logs, programming source code, system files, fonts, backups, disk images, CAD files, and so on. It is noted that the foregoing examples are not meant to be limiting, and that the embodiments can apply to any amount, type, form, etc., of digital content, at any level of granularity, consistent with the scope of this disclosure.

Additionally, it should be appreciated that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another.

A more detailed explanation of these hardware components is provided below in conjunction with FIG. 14. It should additionally be appreciated that the computing devices can include other entities that enable the implementation of the various techniques described herein, without departing from the scope of this disclosure. It should additionally be appreciated that the entities described herein can be combined or split into additional entities, without departing from the scope of this disclosure. It should further be appreciated that the various entities described herein can be implemented using software-based or hardware-based approaches, without departing from the scope of this disclosure.

Accordingly, FIG. 1 provides an overview of the manner in which the system 100 can implement the various techniques described herein, according to some embodiments. A more detailed breakdown of the manner in which these techniques can be implemented will now be provided below in conjunction with FIGS. 2-13.

FIGS. 2-12 illustrate conceptual diagrams of techniques for implementing a temporally-aware multimodal large language model (LLM) to enable searching through digital media assets, according to some embodiments.

Figure 13:
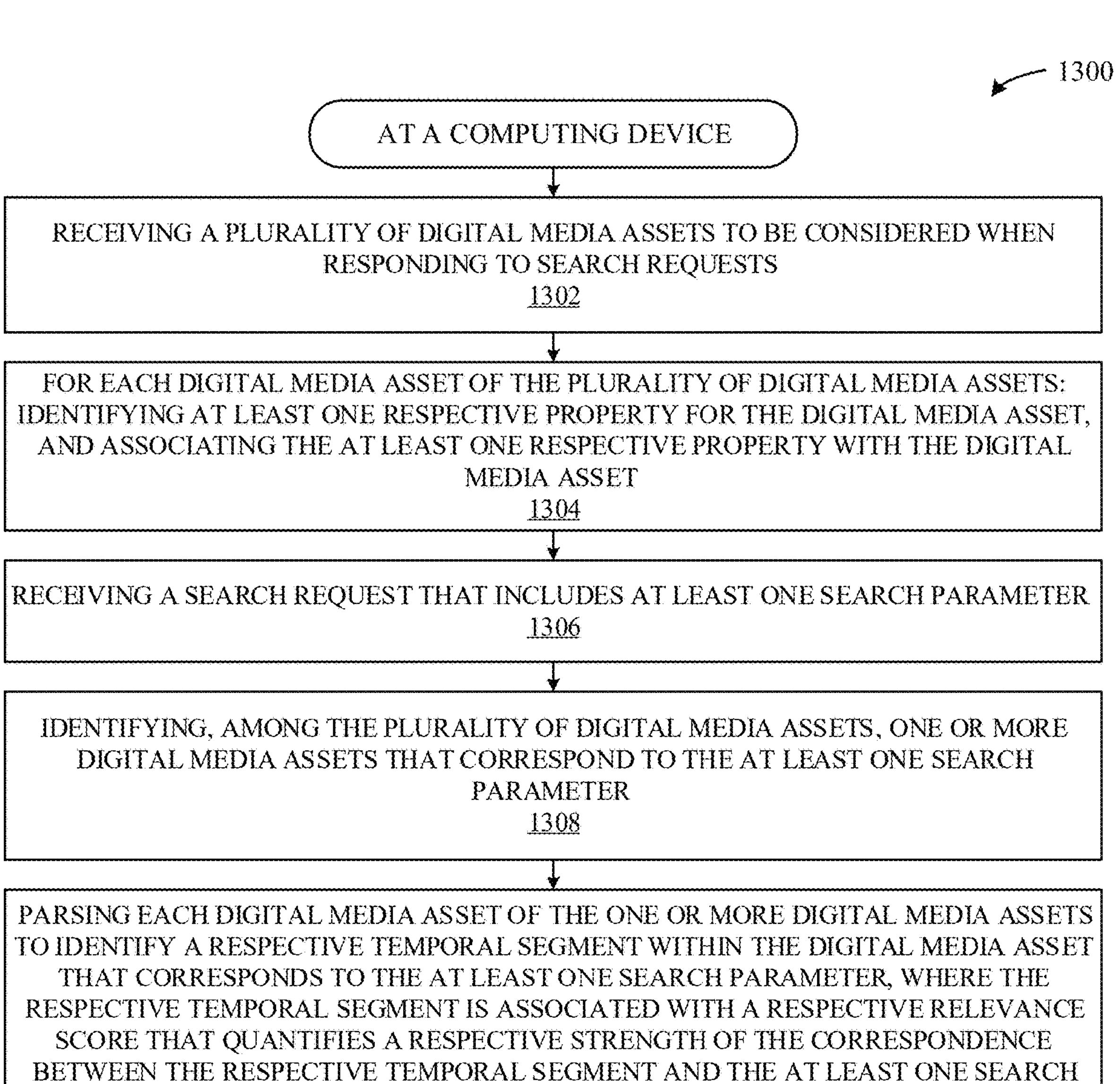
FIG. 13 illustrates a method for searching for relevant temporal segments within digital media assets, according to some embodiments.

FIG. 13 illustrates a method for searching for relevant temporal segments within digital media assets, according to some embodiments.

As shown in FIG. 13, the method 1300 begins at step 1302, where a computing device (e.g., a server computing device 108) receives a plurality of digital media assets to be considered when responding to search requests.

At step 1304, the computing device performs the following steps for each digital media asset of the plurality of digital media assets: identifying at least one respective property for the digital media asset, and associating the at least one respective property with the digital media asset.

At step 1306, the computing device receives a search request that includes at least one search parameter.

At step 1308, the computing device identifies, among the plurality of digital media assets, one or more digital media assets that correspond to the at least one search parameter.

At step 1310, the computing device parses each digital media asset of the one or more digital media assets to identify a respective temporal segment within the digital media asset that corresponds to the at least one search parameter, where the respective temporal segment is associated with a respective relevance score that quantifies a respective strength of the correspondence between the respective temporal segment and the at least one search parameter.

At step 1312, the computing device filters the one or more digital media assets based on the respective relevance scores.

At step 1314, the computing device outputs a user interface (UI) that displays, for each digital media asset of the one or more digital media assets: respective first information that is based on the digital media asset, and respective second information that is based on the respective temporal segment.

FIG. 14 illustrates a detailed view of a computing device 1400 that can represent the computing device 102 of FIG. 1A, according to some embodiments. As shown in FIG. 14, the computing device 1400 can include a processor 1402 that represents a microprocessor or controller for controlling the overall operation of the computing device 1400. The computing device 1400 can also include a user input device 1408 that allows a user of the computing device 1400 to interact with the computing device 1400. For example, the user input device 1408 can take a variety of forms, such as a button, keypad, dial, touch screen, audio input interface, visual/image capture input interface, input in the form of sensor data, and so on. Still further, the computing device 1400 can include a display 1410 that can be controlled by the processor 1402 (e.g., via a graphics component) to display information to the user. A data bus 1416 can facilitate data transfer between at least a storage device 1440, the processor 1402, and a controller 1413. The controller 1413 can be used to interface with and control different equipment through an equipment control bus 1414. The computing device 1400 can also include a network/bus interface 1411 that couples to a data link 1412. In the case of a wireless connection, the network/bus interface 1411 can include a wireless transceiver.

As noted above, the computing device 1400 also includes the storage device 1440, which can comprise a single disk or a collection of disks (e.g., hard drives). In some embodiments, storage device 1440 can include flash memory, semiconductor (solid state) memory or the like. The computing device 1400 can also include a Random-Access Memory (RAM) 1420 and a Read-Only Memory (ROM) 1422. The ROM 1422 can store programs, utilities or processes to be executed in a non-volatile manner. The RAM 1420 can provide volatile data storage, and stores instructions related to the operation of applications executing on the computing device 1400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for searching for relevant temporal segments within digital media assets, the method comprising, by a computing device:

receiving a plurality of digital media assets to be considered when responding to search requests;

identifying respective properties for the plurality of digital media assets, receiving a search request that includes at least one search parameter;

identifying a subset of the plurality of digital media assets that correspond to the at least one search parameter;

parsing the subset of the plurality of digital media assets to identify respective temporal segments within corresponding digital media assets of the subset of the plurality of digital media assets that corresponds to the at least one search parameter, wherein a given respective temporal segment of the respective temporal segments is associated with a respective relevance score that quantifies a respective strength of a correspondence between the given respective temporal segment and the at least one search parameter;

filtering the subset of the plurality of digital media assets based on respective relevance scores; and outputting a user interface that displays, respective first information that is based on the subset of the plurality of digital media assets, and respective second information that is based on the respective temporal segments.

2. The method of claim 1, wherein a given digital media asset of the plurality of digital media assets includes audio content, video content, or some combination thereof.

3. The method of claim 1, wherein, for a given digital media asset of the subset of the plurality of digital media assets the respective first information includes first audio content, first visual content, or some combination thereof, associated with the given digital media asset, and the respective second information includes:

second audio content, second visual content, or some combination thereof, associated with a corresponding temporal segment, the respective relevance score, and a respective description of the corresponding temporal segment.

4. The method of claim 1, wherein identifying the respective properties includes analyzing:

audio content associated with a given digital media asset of the plurality of digital media assets;

video content associated with the given digital media asset;

subtitle content associated with the given digital media asset;

metadata content associated with the given digital media asset; or some combination thereof.

5. The method of claim 4, wherein a corresponding property of the respective properties for the given digital media asset of the plurality of digital media assets includes a vector that corresponds to at least a portion of the audio content, the video content, the subtitle content, the metadata content, or some combination thereof, associated with the given digital media asset.

6. The method of claim 1, wherein the at least one search parameter includes a description of content that is being sought for playback.

7. The method of claim 1, further comprising:

receiving a selection of a particular digital media asset among the subset of the plurality of digital media assets; and playing back the particular digital media asset in accordance with a corresponding temporal segment of the respective temporal segments.

8. A non-transitory computer-readable storage medium configured to store instructions that, when executed by a processor included in a computing device, cause the computing device to perform operations including:

receiving a plurality of digital media assets to be considered when responding to search requests;

identifying respective properties for the plurality of digital media assets, receiving a search request that includes at least one search parameter;

identifying a subset of the plurality of digital media assets that correspond to the at least one search parameter;

parsing the subset of the plurality of digital media assets to identify respective temporal segments within corresponding digital media assets of the subset of the plurality of digital media assets that corresponds to the at least one search parameter, wherein a given respective temporal segment of the respective temporal segments is associated with a respective relevance score that quantifies a respective strength of a correspondence between the given respective temporal segment and the at least one search parameter;

filtering the subset of the plurality of digital media assets based on respective relevance scores; and outputting a user interface that displays, respective first information that is based on the subset of the plurality of digital media assets, and respective second information that is based on the respective temporal segments.

9. The non-transitory computer-readable storage medium of claim 8, wherein a given digital media asset of the plurality of digital media assets includes audio content, video content, or some combination thereof.

10. The non-transitory computer-readable storage medium of claim 8, wherein, for a given digital media asset of the subset of the plurality of digital media assets the respective first information includes first audio content, first visual content, or some combination thereof, associated with the given digital media asset, and the respective second information includes:

second audio content, second visual content, or some combination thereof, associated with a corresponding temporal segment, the respective relevance score, and a respective description of the corresponding temporal segment.

11. The non-transitory computer-readable storage medium of claim 8, wherein identifying the respective properties includes analyzing:

audio content associated with a given digital media asset of the plurality of digital media assets;

video content associated with the given digital media asset;

subtitle content associated with the given digital media asset;

metadata content associated with the given digital media asset; or some combination thereof.

12. The non-transitory computer-readable storage medium of claim 11, wherein a corresponding property of the respective properties for the given digital media asset of the plurality of digital media assets includes a vector that corresponds to at least a portion of the audio content, the video content, the subtitle content, the metadata content, or some combination thereof, associated with the given digital media asset.

13. The non-transitory computer-readable storage medium of claim 8, wherein the at least one search parameter includes a description of content that is being sought for playback.

14. The non-transitory computer-readable storage medium of claim 8, wherein the operations further include:

receiving a selection of a particular digital media asset among the subset of the plurality of digital media assets; and playing back the particular digital media asset in accordance with a corresponding one of the respective temporal segments.

15. A computing device, comprising:

at least one processor; and at least one memory configured to store instructions that, when executed by the at least one processor, cause the computing device to perform operations including:

receiving a plurality of digital media assets to be considered when responding to search requests;

identifying respective properties for the plurality of digital media assets, receiving a search request that includes at least one search parameter;

identifying a subset of the plurality of digital media assets that correspond to the at least one search parameter;

parsing the subset of the plurality of digital media assets to identify respective temporal segments within corresponding digital media assets of the subset of the plurality of digital media assets that corresponds to the at least one search parameter, wherein a given respective temporal segment of the respective temporal segments is associated with a respective relevance score that quantifies a respective strength of a correspondence between the given respective temporal segment and the at least one search parameter;

filtering the subset of the plurality of digital media assets based on respective relevance scores; and outputting a user interface that displays, respective first information that is based on the subset of the plurality of digital media assets, and respective second information that is based on the respective temporal segments.

16. The computing device of claim 15, wherein a given digital media asset of the plurality of digital media assets includes audio content, video content, or some combination thereof.

17. The computing device of claim 15, wherein, for a given digital media asset of the subset of the plurality of digital media assets the respective first information includes first audio content, first visual content, or some combination thereof, associated with the given digital media asset, and the respective second information includes:

second audio content, second visual content, or some combination thereof, associated with a corresponding temporal segment, the respective relevance score, and a respective description of the corresponding temporal segment.

18. The computing device of claim 15, wherein identifying the respective properties includes analyzing:

audio content associated with a given digital media asset of the plurality of digital media assets;

video content associated with the given digital media asset;

subtitle content associated with the given digital media asset;

metadata content associated with the given digital media asset; or some combination thereof.

19. The computing device of claim 18, wherein a corresponding property of the respective properties for the given digital media asset of the plurality of digital media assets includes a vector that corresponds to at least a portion of the audio content, the video content, the subtitle content, the metadata content, or some combination thereof, associated with the given digital media asset.

20. The computing device of claim 15, wherein the at least one search parameter includes a description of content that is being sought for playback.

* * * * *